US012456369B1

(12) United States Patent
Brown

(10) Patent No.: US 12,456,369 B1
(45) Date of Patent: Oct. 28, 2025

(54) EARLY SIGNAL CHANGE ILLUMINATION SYSTEM FOR TRAFFIC LIGHTS

(71) Applicants: Joseph Kalani Brown, Phoenix, AZ (US); Kevin Anthony Brown, Phoenix, AZ (US)

(72) Inventor: Kevin Anthony Brown, Phoenix, AZ (US)

( * ) Notice: Subject to any disclaimer, the term of this patent is extended or adjusted under 35 U.S.C. 154(b) by 0 days.

(21) Appl. No.: 18/088,939

(22) Filed: Dec. 27, 2022

Related U.S. Application Data

(60) Provisional application No. 63/303,552, filed on Jan. 27, 2022.

(51) Int. Cl.
*G08G 1/07* (2006.01)
*G08G 1/095* (2006.01)

(52) U.S. Cl.
CPC ............... *G08G 1/07* (2013.01); *G08G 1/095* (2013.01)

(58) Field of Classification Search
CPC ................................ G08G 1/07; G08G 1/095
See application file for complete search history.

(56) References Cited

U.S. PATENT DOCUMENTS

| | | | | |
|---|---|---|---|---|
| 2,705,789 | A * | 4/1955 | Barker | G08G 1/08 340/918 |
| 3,408,623 | A | 10/1968 | Wagner | |
| 4,031,507 | A * | 6/1977 | Johnson | A01G 25/162 340/916 |
| 4,200,860 | A | 4/1980 | Fritzinger | |
| 4,371,863 | A | 2/1983 | Fritzinger | |
| 4,827,258 | A * | 5/1989 | Evans | G08G 1/096 340/929 |
| 4,908,616 | A | 3/1990 | Walker | |
| 6,310,562 | B1 | 10/2001 | Safronov et al. | |
| 7,330,130 | B2 | 2/2008 | Bolotin et al. | |
| 9,064,411 | B1 | 6/2015 | Patton, Jr. | |
| 10,192,436 | B2 | 1/2019 | Bauer | |
| 10,672,268 | B1 | 6/2020 | Weader | |
| 2003/0048201 | A1 | 3/2003 | Weiss et al. | |

(Continued)

FOREIGN PATENT DOCUMENTS

| | | |
|---|---|---|
| DE | 2711378 A1 | 9/1978 |
| RU | 2325704 C2 | 5/2008 |

(Continued)

*Primary Examiner* — Daryl C Pope
(74) *Attorney, Agent, or Firm* — John Rizvi; John Rizvi, P.A.—The Patent Professor®

(57) ABSTRACT

A method, a system and a computer program product provide an advance signal change notification for a traffic light system. A light change indicator (LCI) utility/module provides imminent light change warning signals to enable drivers and pedestrians to make decisions that can enhance traffic safety. The LCI module turns on a yellow traffic light to provide a light change warning via simultaneous illumination of a green traffic light and the yellow traffic light prior to expiration of the green light illumination interval. The yellow light remains illuminated until the end of the green light interval. According to an aspect, the yellow light flashes a pre-established number of times before the green light interval expires. The LCI module turns off the green light and allows the yellow light to remain on for a duration of the yellow light illumination interval.

18 Claims, 6 Drawing Sheets

(56) References Cited

U.S. PATENT DOCUMENTS

| | | | |
|---|---|---|---|
| 2004/0189491 A1 | 9/2004 | Aydin | |
| 2005/0156757 A1 | 7/2005 | Garner | |
| 2006/0092044 A1 | 5/2006 | Naljotov | |
| 2009/0135024 A1 | 5/2009 | Park et al. | |
| 2017/0103650 A1 | 4/2017 | Amadon | |
| 2019/0088120 A1* | 3/2019 | Adireddy | G08G 1/081 |

FOREIGN PATENT DOCUMENTS

| | | |
|---|---|---|
| WO | WO1999054855 A1 | 10/1999 |
| WO | WO2013003096 A1 | 1/2013 |

* cited by examiner

EARLY SIGNAL CHANGE ILLUMINATION SYSTEM FOR TRAFFIC LIGHTS

CROSS-REFERENCE TO RELATED APPLICATION

This application claims the benefit of U.S. Provisional Patent Application No. 63/303,552, filed on Jan. 27, 2022, which is incorporated herein by reference in its entirety.

FIELD OF THE INVENTION

The present invention relates generally to traffic light systems, and more particularly, to signal change warning for traffic light systems.

BACKGROUND OF THE INVENTION

The traffic light system is a universally understood system that includes signaling devices positioned at road intersections and other locations, to control/regulate the flows of traffic on the roadways. Traffic lights follow a universal color code that determines who can proceed and Who must stop. The universal color code includes a sequence of illuminating lamps or LEDs of three standard colors, and more specifically, a green light, a red light and a yellow or amber light. The green light allows traffic to proceed in a specified direction, if it is safe to do so and there is room on the other side of the intersection. The red light prohibits any traffic from proceeding. A flashing red indication requires traffic to stop and then proceed when safe; the flashing red traffic light is considered equivalent to a stop sign. The yellow or amber light provides a warning that the signal is about to change to red, with some jurisdictions requiring drivers to stop if it is safe to do so, and others allowing drivers to go through the intersection if safe to do so. Occasionally, traffic signals will go into a flashing mode if a fault is detected. In this flashing mode, the traffic signaling apparatus may display flashing yellow or amber to the main road and flashing red to the side road.

Despite the fact that traffic lights are widely deployed, a substantial number of traffic accidents continue to occur. In some cases, these accidents are attributed to the uncertainty regarding the time duration of a particular traffic light and/or the time remaining before the light changes. Furthermore, traffic light ON and OFF intervals are not standardized which adds to the drivers' and pedestrians' uncertainty.

Ideally, it would be extremely useful to provide a system that enables a driver within a particular range of a traffic light to reliably determine whether the light is at the starting or ending phase and how soon before the traffic light changes in order to make safer driving decisions. In addition, the system should enable the user to receive unambiguous indications that do not conflict with traffic regulations or pre-established universal traffic signaling standards.

Accordingly, there is need for a versatile, flexible, and intuitive solution that can be efficiently implemented and readily understood without requiring a drastic overhaul of the traffic signaling system.

SUMMARY OF THE INVENTION

The present invention is directed to a method, a system and a computer program product for providing an advance signal change notification for a traffic light system. A light change indicator (LCI) utility/module provides imminent light change warning signals to enable drivers and pedestrians to make decisions that can enhance traffic safety. The LCI module turns on a yellow or amber traffic light, hereinafter referred to generally as yellow light, to provide a light change warning via simultaneous illumination of a green traffic light and the yellow traffic light prior to expiration of the green light illumination interval. The yellow light remains illuminated until the end of the green light interval. According to an aspect, the yellow light flashes a pre-established number of times before the green light interval expires. The LCI module turns off the green light and allows the yellow light to remain on for a duration of the yellow light interval. According to an aspect, the LCI module also provides an imminent light change indicator to indicate an imminent switch from the yellow light to the red light. As the yellow light interval ends, the LCI module turns off the yellow light and turns on the red traffic light.

According to an aspect, a driver or individual that sees only the illuminated green light will have received indication that the green light illumination is at an earlier stage of the green light illumination interval. On the other hand, a driver or individual that sees the simultaneous illumination of the green light and the yellow light will have received indication that the green light illumination is at a closing stage of the green light illumination interval.

According to an aspect, the LCI module provides a flashing traffic light near the end of a traffic light interval as an intuitive way to indicate an imminent change in traffic light signaling. As a result, the LCI module enhances the traffic light signaling system without drastically overhauling the system by providing intuitive signal change indicators that do not require the driver or pedestrian to learn an entirely new traffic signaling protocol.

According to an aspect, the LCI module provides one or more imminent light change indications that allow a driver to track the current state of a traffic light, to accurately predict the next state and to determine how imminent the change to the next traffic light state is.

According to an aspect, by providing imminent light change indicators, such as simultaneous green and yellow light illumination and/or flashing/blinking lights, in specific time intervals/sub-intervals, the LCI module helps to reduce uncertainty attributable to erratic light changing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left". "rear", "tight". "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward providing an advance signal change notification for a traffic light system to enable drivers and pedestrians to make decisions that can enhance traffic safety.

Figure 1:
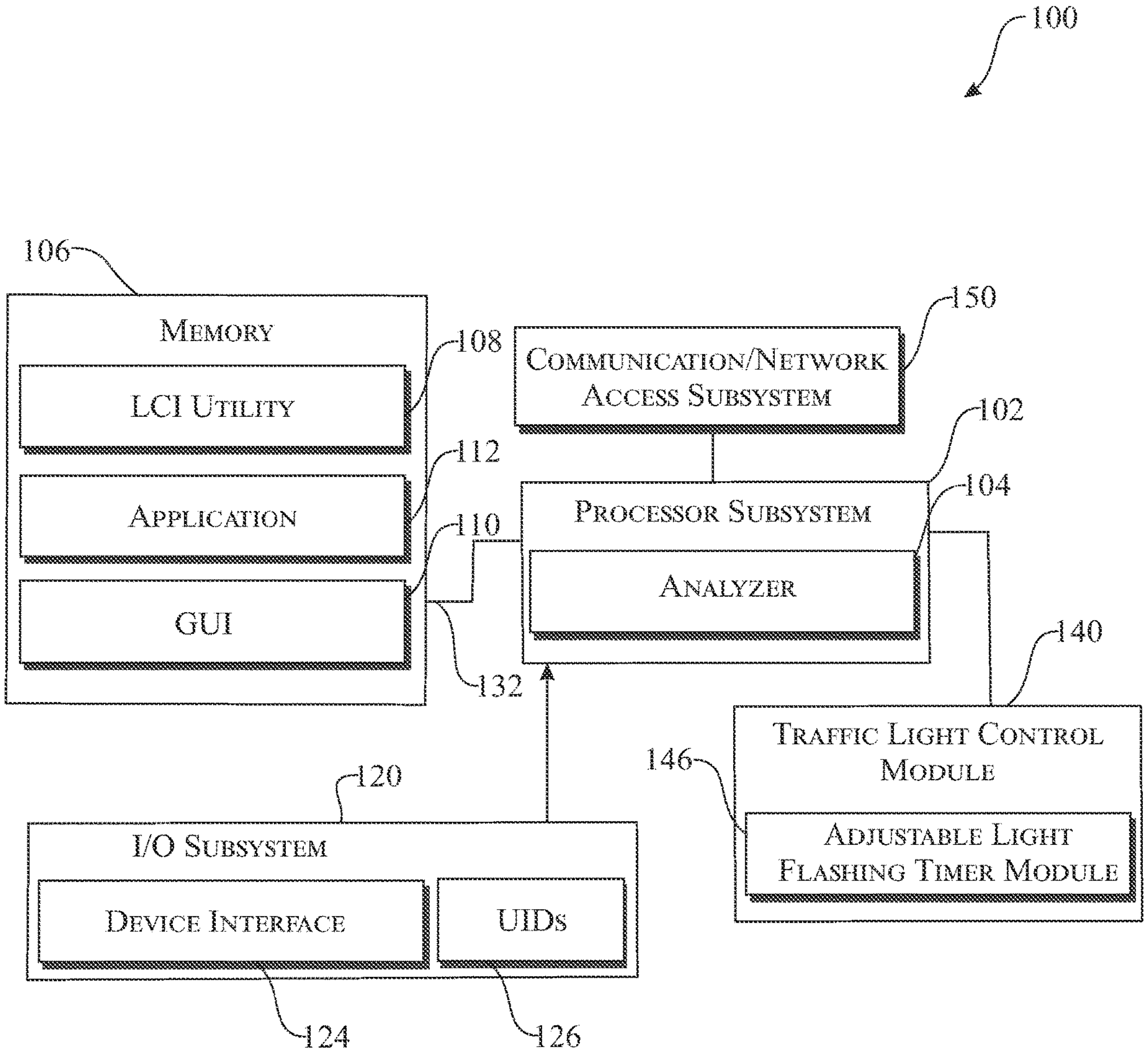
FIG. 1 illustrates a block diagram representation of an example data processing system within which certain features of the present disclosure can be implemented, according to one or more embodiments.

With reference now to the figures, and beginning with FIG. 1, there is depicted a block diagram representation of a data processing system (DPS) 100 in accordance with one illustrative embodiment of the invention. The data processing system 100 may be a server, a digital audio workstation, a personal computer, a portable device, such as a personal digital assistant (PDA), a smart phone, and/or other types of electronic devices that may generally be considered processing devices or computing systems/devices. As illustrated, data processing system 100 comprises at least one processor subsystem 102 connected to system memory 106 via system interlink/bus 132. Data processing system 100 executes one or more computer programs/applications to provide an advance signal change notification for a traffic light system to enable drivers and pedestrians to make decisions that can enhance traffic safety.

In one or more embodiments, the data processing system 100 is utilized as part of an interconnected traffic light system that includes signaling devices positioned at road intersections. In one embodiment, the data processing system 100 is communicatively connected to the signaling devices via light control circuitry/modules included within the signaling devices. In one or more related embodiments, the data processing system 100 and the various signaling devices respectively include server functionality and client functionality provided by a light control module.

In one or more embodiments, data processing system 100, which is managed by processor subsystem 102, also includes communication subsystem 150, and input/output (I/O) subsystem 120. In addition, the data processing system 100 includes a traffic light control module 140. As shown, processor subsystem 102 includes an analyzer module 104 to support the data analysis functionality of data processing system 100. Processor subsystem 102 executes program code to provide operating functionality of data processing system 100. The software and/or firmware modules have varying functionality when their corresponding program code is executed by processor subsystem 102 or secondary processing devices (not explicitly shown) within data processing system 100.

The I/O subsystem 120 includes user interface devices (UIDs) 126. In addition, I/O subsystem 120 includes various types of interfaces, including device interfaces 124, to communicatively connect the data processing system 100 to traffic light signaling devices.

Processor subsystem 102 is communicatively coupled, via system bus/interlink 132, to device memory 106. In one or more embodiments, processor subsystem 102 is communicatively coupled via system interlink 132 to communication subsystem 150, data storage subsystem 140, and input/output subsystem 120. System interlink 132 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components.

Communication subsystem 150 may be configured to enable data processing system 100 to communicate with a plurality of personal computing devices. The communication subsystem may include wired and/or wireless communication devices to facilitate networked communication. Communication subsystem 1.50 also includes a Network Access Module by which data processing system 100 may connect to one or more access/external networks such as, but not limited to, the Internet or another wide area network (WAN), an internal network such as an Ethernet (local area network LAN), or a Virtual Private Network (VPN).

In addition to the above described hardware components of data processing system 100, various features of the invention are completed/supported via software (or firmware) code or logic stored within memory 106 or other storage and executed by processor subsystem 102. Thus, for example, illustrated within memory 106 are a number of software/firmware/logic components, including Application 112 and other applications (not shown). In addition, memory 106 comprises a Light Change Indicator (LCI) module/logic/utility 108. Device memory 106 further includes an operating system (OS) (not shown), a firmware interface, such as basic input/output system (BIOS) or Uniform Extensible Firmware Interface (UM), and firmware (not shown). Device memory 106 includes a graphical user interface (GUI) 110, and/or other computer data (not explicitly shown) used by the LCI utility 108 and/or the application 112.

The Traffic Light Control Module 140 comprises an adjustable light flashing tinier module 146. In addition, the Traffic Light Control Module 140 enables further storage and retrieval of data, instructions, and code. For example, the Traffic Light Control Module 140 can provide, for use by the LCI utility 108, software components of the adjustable light flashing timer module 146. In addition, the Traffic Light Control Module 140 can provide a selection of program code and applications that can be used to provide an advance signal change notification for a traffic light system. These applications can be loaded into device memory 106 for execution by processor subsystem 102.

In actual implementation, the LCI logic/utility 108 may be combined with the application 112 to provide a single executable component, collectively providing the various functions of each individual component when the corresponding combined component is activated. For simplicity, the LCI logic/utility 108 is illustrated and described as a stand-alone or separate logic/firmware component, which provides specific functions, as described below.

In one embodiment, data processing system 100 communicates with a software deploying server (not shown) via a network (e.g., the Internet) using communication subsystem/network access module 150. Then, LCI utility 108 may be deployed from/on the network, via the software deploying server. With this configuration, the software deploying server performs all of the functions associated with the execution of LCI utility 108. Accordingly, data processing system 100 is not required to utilize internal computing resources of data processing system 100 to execute LCI utility 108.

Certain of the functions supported and/or provided by the LCI utility/module 108 are implemented as processing logic (or code) executed by processor subsystem 102 and/or other device hardware, which processing logic enables the device to implement/perform those function(s). Among the software code/instructions/logic provided by the LCI module 108, and which are specific to the disclosure, are: (a) logic for turning on a yellow or amber traffic light, hereinafter referred to generally as yellow light, to provide simultaneous illumination of a green traffic light and the yellow traffic light at a specified amount of time prior to an end of a green light illumination interval; (b) logic for enabling the yellow light to flash a pre-established number of times until the green light interval elapses; (c) logic for turning off the green light and allowing the yellow light to remain on as the yellow light illumination interval begins; (d) logic for turning off the yellow light at an end of the yellow light illumination interval; and (e) logic for turning on the red traffic light in response to turning off the yellow light. According to the illustrative embodiment, when processor subsystem 102 executes the LCI logic/module 108, data processing system 100 initiates a series of functional processes that enable the above functional features as well as additional features/functionality. These features/functionalities are described in greater detail below within the description of FIGS. 2-6.

Those of ordinary skill in the art will appreciate that the hardware components and basic configuration depicted in FIG. 1 may vary. The illustrative components within data processing system 100 are not intended to be exhaustive, but rather are representative to highlight components that are utilized to implement the present disclosure. For example, other devices/components may be used in addition to or in place of the hardware depicted. The depicted example is not meant to imply architectural or other limitations with respect to the presently described embodiments and/or the general disclosure.

Figure 2:
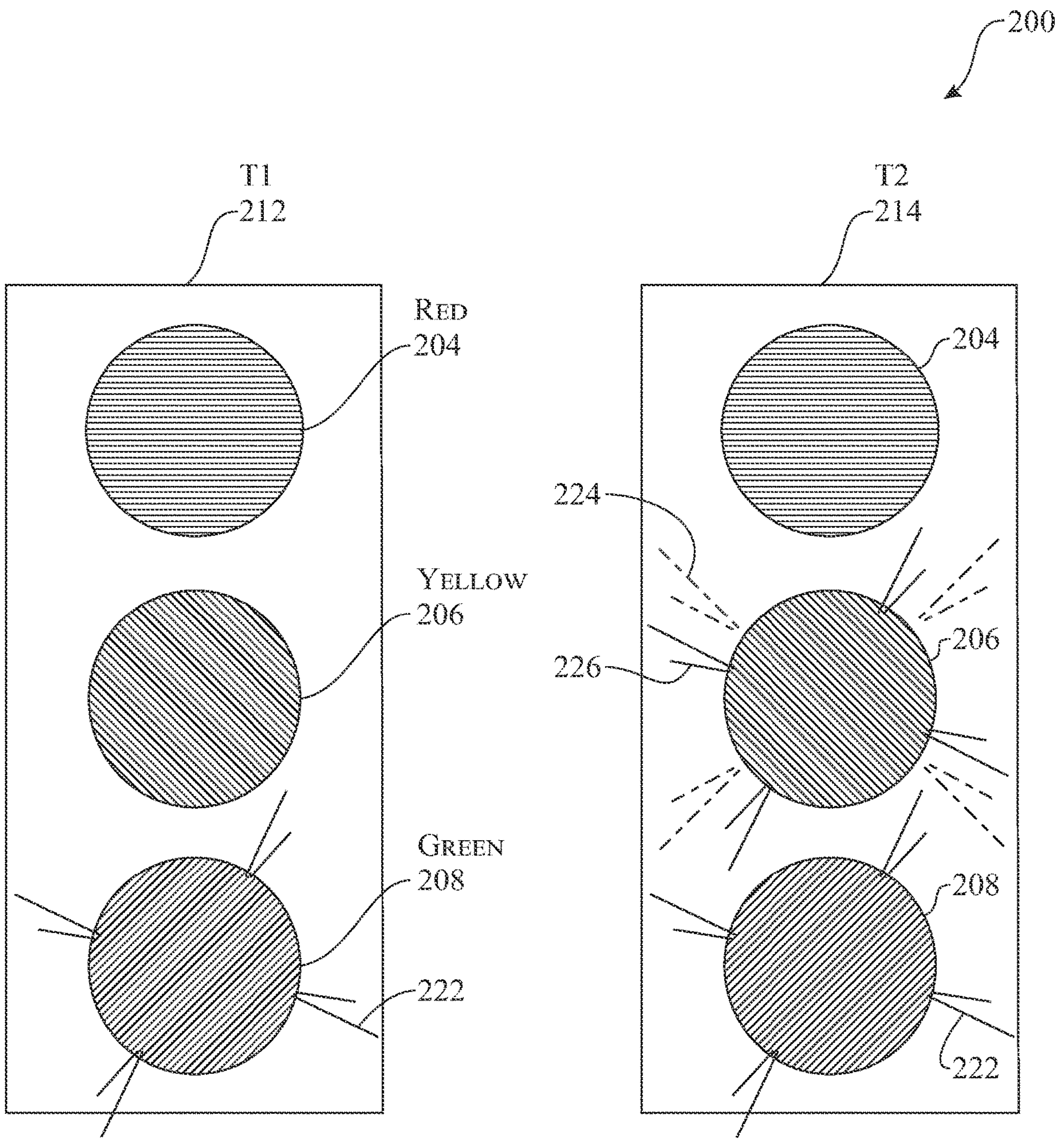
FIG. 2 illustrates a traffic light signaling device showing a transition from a green light to a yellow light via a signal change indicator, according to one or more embodiments of the disclosure.

Referring now to FIG. 2, a traffic light signaling device 200 is shown at different time instants T1 and T2, illustrating a transition from a green light to a yellow light via a signal change indicator, according to one or more embodiments of the disclosure. As illustrated in the traffic signal device 200, a red light 204, a green light 206 and a yellow light 208 are included. The traffic light signaling device 200, which can include components that are similarly configured to components of data processing system 100 (FIG. 1), includes a traffic light control module/circuitry (not shown). One or more traffic signaling devices are connected by a network. The network can be any of the various networks, including a LAN or a WAN/Internet, described in FIG. 1.

The traffic lighting device 200 can be connected via the network to the data processing system 100. The LCI utility/module 108 can download configuration and control information to various individual traffic lighting devices 200 remotely over the network.

According to one or more aspects, and as illustrated in FIG. 2, the green light 208 is the only traffic light illuminated at time instant T1 which occurs within a first/earlier sub-interval of the green light illumination interval, during which the green light 208 may be constantly or non-intermittently illuminated, as denoted by solid line light rays 222. At a subsequent time instant T2, which is included within a second/later sub-interval of the green light illumination interval, both the green light 208 and the yellow light 206 are illuminated. According to one or more embodiments, the yellow light 206 is illuminated in a flashing or intermittent manner as indicated by the dashed lines of light rays 224 while the green light 208 may remain constantly illuminated as indicated by solid light rays 222. According to one or more related embodiments, the yellow light 206 flashes a preset number of times until the green light illumination interval ends. The flashing yellow light 206 indicates that the green light 208 will very soon be disengaged. According to other embodiments, the yellow light 206 is illuminated via a constant/steady (non-flashing) state, indicated by solid light rays 226, until the green light illumination interval ends. A driver or pedestrian/individual that sees only an illuminated green light 208 will have received indication, and is thereby able to discern, that the green light illumination is at an earlier stage of the green light illumination interval. If the driver or individual sees the simultaneous illumination of the green light 208 and the yellow light 206, the driver or individual will have received indication, and is thereby able to discern, that the green light illumination is at a closing stage of the green light illumination interval.

Figure 3:
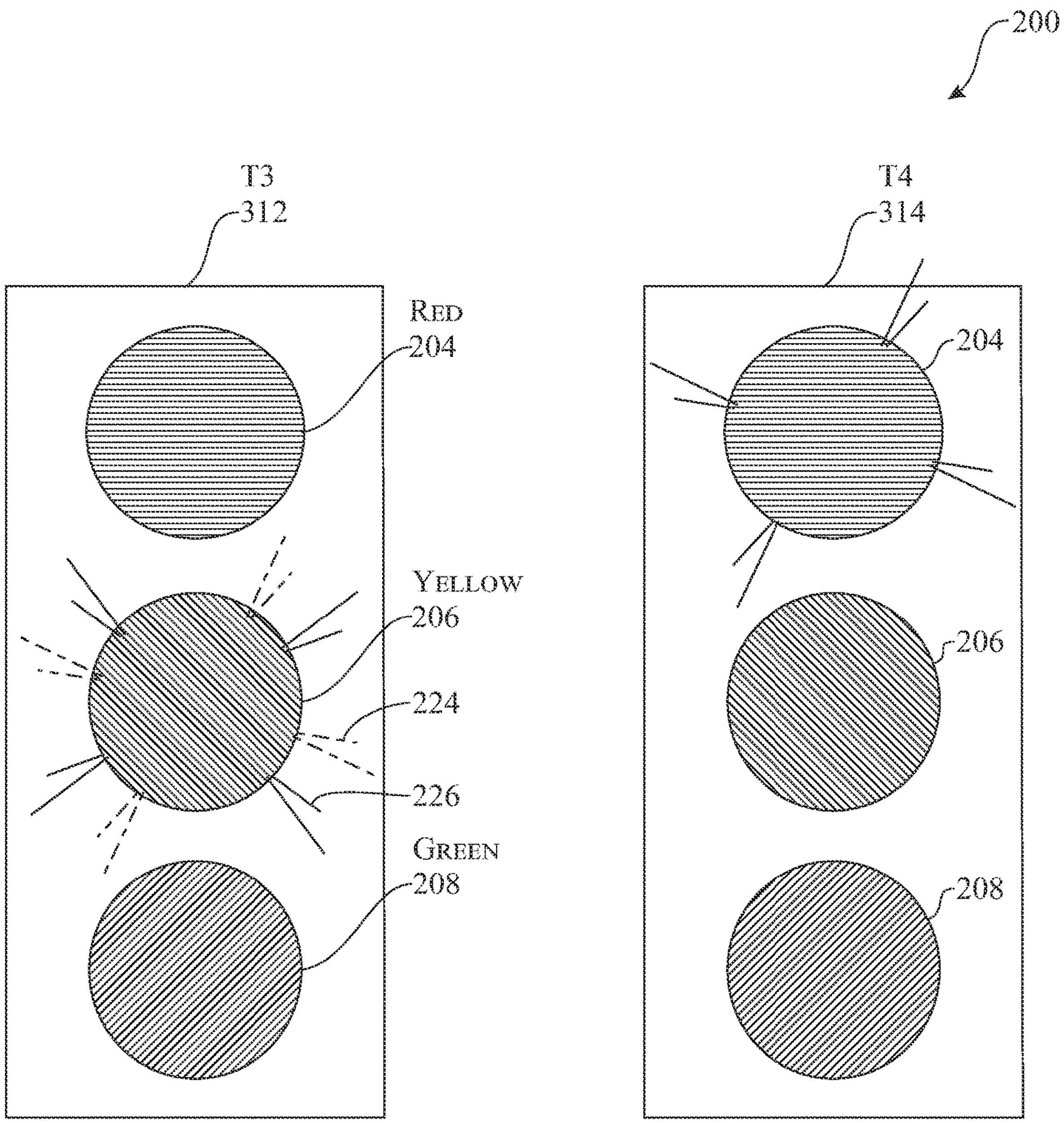
FIG. 3 illustrates a traffic light signaling device showing yellow traffic light signaling during a yellow light illumination interval and a transition from the yellow light to the red light, according to one or more embodiments of the disclosure.

The illustration of FIG. 3 depicts a traffic light signaling device showing yellow light signaling during a yellow light illumination interval and a transition from the yellow light 206 to the red light 204. The illustration shows the state of the light signaling device 200 at time instants T3 312 and T4 314, which collectively represent a continuation from the illumination instants T1 212 and T2 214 illustrated in FIG. 2. I.e., the light signaling device 200 may follow a sequence defined by instants T1, T2, T3 and T4 in the depicted order and as described herein.

According to one or more aspects, and as illustrated in FIG. 3, the yellow light 206 is the only traffic light illuminated at time instant T3 which is subsequent to the green light illumination interval. According to an aspect, when the green light 208 is turned off or disengaged at an end of the green light illumination interval, the yellow light 206 remains on or illuminated.

According to one embodiment, upon reaching the yellow light illumination interval illustrated in instant T3 312, the yellow light 206 stops flashing and remains solid/steady (i.e., in a non-flashing illuminated state) as indicated by solid line light rays 226 for a preset time period (e.g., an additional five (5) seconds). When the preset time period elapses, the system switches to the red light "ON" state depicted at instant T4 314, in which only the red light 204 is illuminated. According to another embodiment, upon reaching the yellow light illumination interval illustrated in instant T3 312, the yellow light 206 does not stop flashing but rather continues to flash/blink for a preset time period (e.g., an additional five (5) seconds) as indicated by discontinuous light rays 224. According to an aspect of the invention, the LCI module 108 selects and utilizes a preset time period that would likely ensure that vehicles that were able to continue driving while properly responding to the yellow light 206 should have advanced beyond the traffic intersection enabling the vehicle to avoid obstructing a flow of traffic. When the preset time period elapses, the red light 204 only engages, as shown at time instant T4 314. By providing imminent light change indicators, such as simultaneous green and yellow light illumination and/or flashing/blinking lights, in specific time intervals/sub-intervals, the LCI module 108 helps to reduce uncertainty attributable to erratic light changing.

According to an aspect, the LCI module 108 provides a flashing traffic light near the end of a traffic light interval as an intuitive way to indicate an imminent change in traffic light signaling. As a result, the LCI module 108 enhances the traffic light signaling system without drastically overhauling the system by providing intuitive signal change indicators that do not require the driver or pedestrian to learn an entirely new traffic signaling protocol.

According to an aspect, the LCI module 108 provides one or more imminent light change indications that allow a driver to track the current state of a traffic light, to accurately predict the next state and to determine how imminent the change to the next traffic light state is.

Although the disclosure is described with reference to traffic light illumination intervals having a specific duration, the disclosure can be applied to and/or incorporated with illumination intervals of various different durations. Furthermore, the number of traffic light flashes are not limited to any particular number. Specific values attributed to the illumination interval duration and/or number of flashes are provided to facilitate a clear presentation and explanation of the process of providing early/advance warning of an imminent traffic light change. Thus, the described functions, features and/or processes of the disclosure are by no means limited to a process associated with any particular attribute value.

Figure 4:
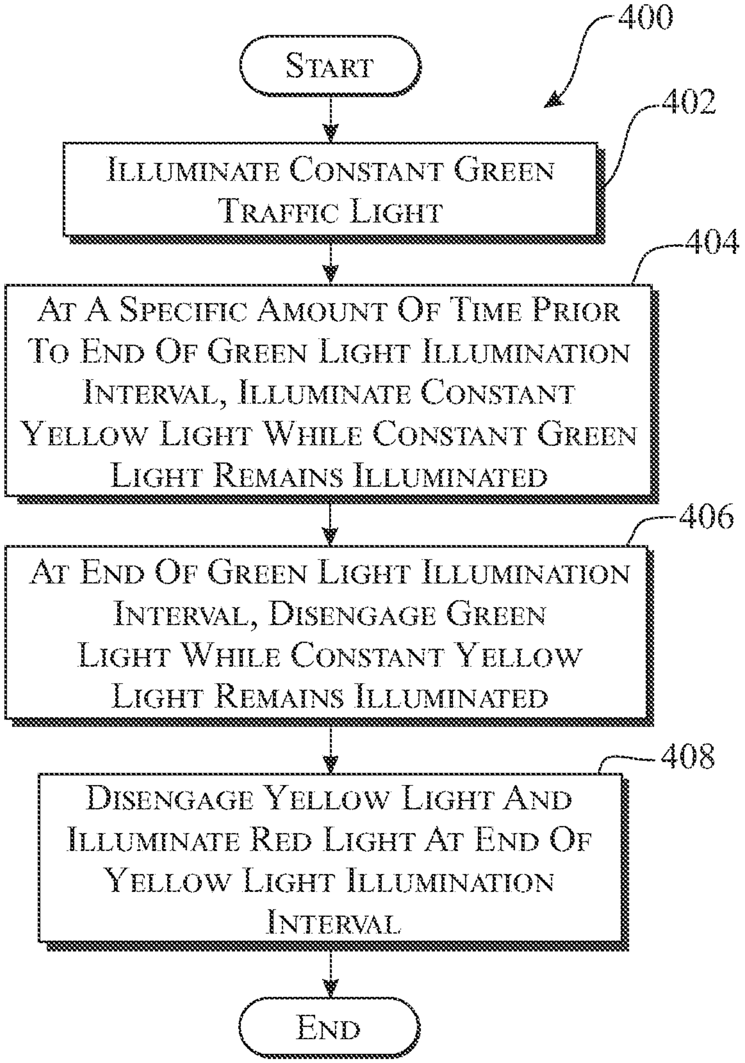
FIG. 4 presents a flowchart illustrating the process of providing a traffic signal change from a green light to a red light using simultaneous green and yellow light illumination, according to one or more embodiments.
Figure 5:
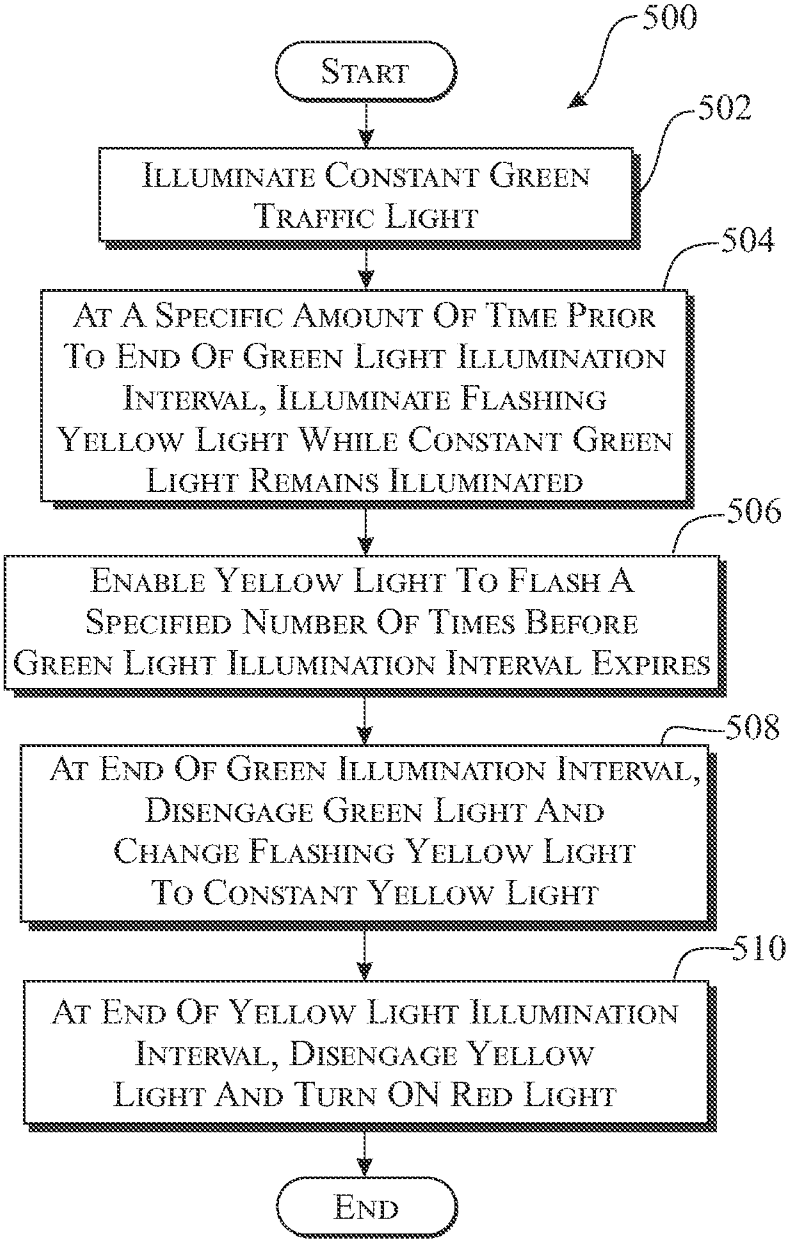
FIG. 5 presents a flowchart illustrating the process of providing a traffic signal change from a green light, to a red light using simultaneous green and flashing yellow light illumination, according to one or more embodiments.
Figure 6:
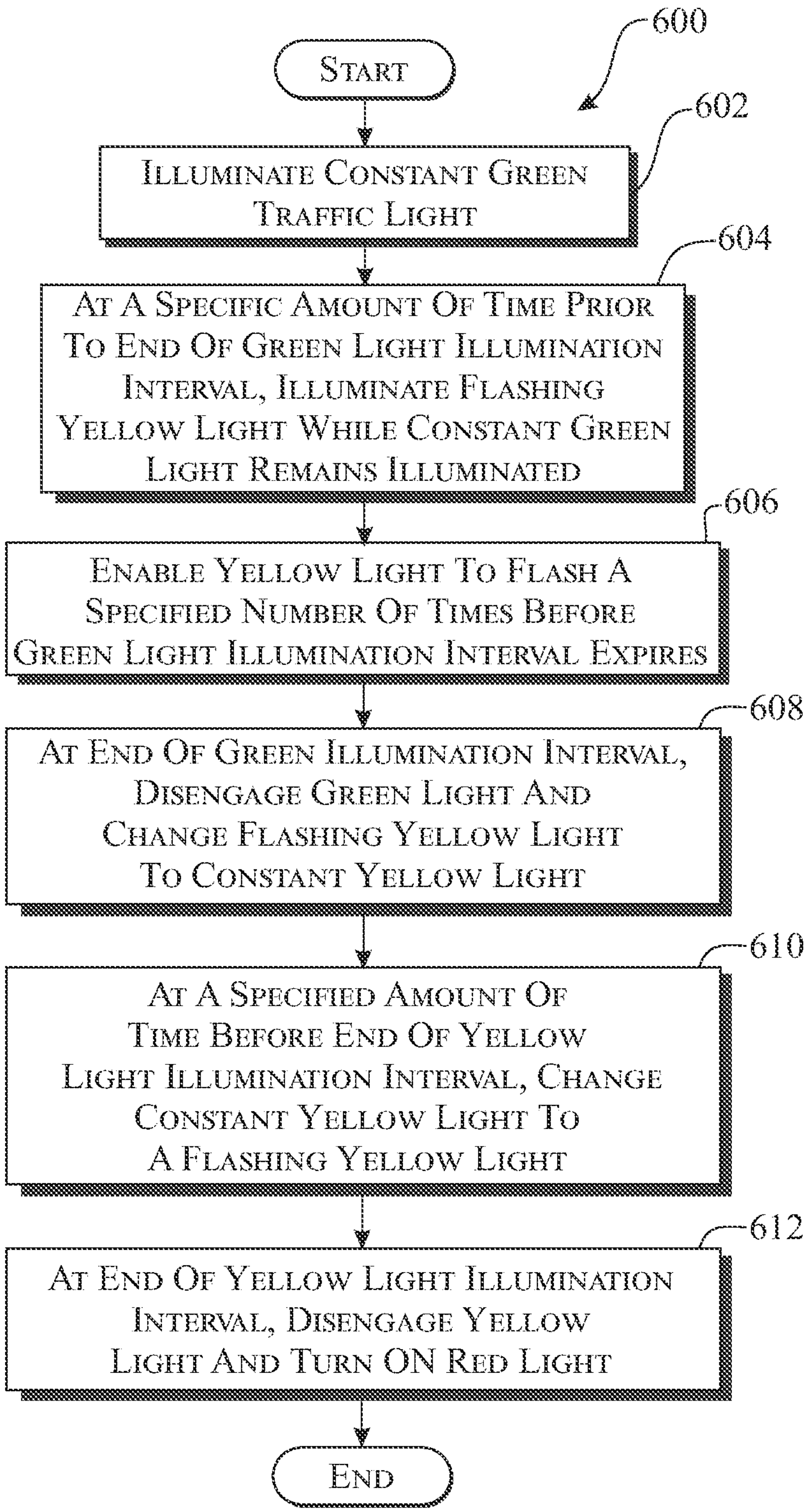
FIG. 6 presents a flowchart illustrating the process of providing a traffic signal change from a solid yellow light to a flashing yellow light at the end of the yellow light illumination interval, according to one or more embodiments.

The illustrations of FIGS. 4-6 are flowcharts illustrating various methods by which the above process of the illustrative embodiments is completed. Although the methods illustrated in FIGS. 4-6 may be described with reference to components shown in FIGS. 1-3, it should be understood that this is merely for convenience and alternative components and/or configurations thereof can be employed when implementing the various methods. Key portions of the methods may be completed by the light change indicator (LCI) utility/module 108 executing on processor subsystem 102 within data processing system 100 (FIG. 1) and controlling specific operations of/on data processing system 100, and the methods are thus described from the perspective of either/both the LCI module 108 and data processing system 100 or other device that provides the functionality associated with one or more versions of the LCI module 108.

The illustration of FIG. 4 presents a flowchart illustrative of the process of providing a traffic signal change from a green light to a red light using simultaneous green and yellow light illumination, according to one or more embodiments. The process of FIG. 4 begins at the initiator/start block and proceeds to step 402 or green light illumination interval, at which the LCI module 108 illuminates the green traffic light 208 in a constant/solid/non-flashing state. At a specified amount of time prior to an end of green light illumination interval, the LCI module 108 illuminates a constant or non-flashing yellow light 206 while the constant green light 208 remains illuminated, as shown at step 404.

According to an aspect, a driver or pedestrian/individual that sees only the illuminated green light 206 will have received indication that the green light illumination is at an earlier stage of the green light illumination interval. On the other hand, a driver or individual that sees the simultaneous illumination of the green light 208 and the yellow light 206 will have received indication that the green light illumination is at a closing stage of the green light illumination interval.

At step 406, at the end of the green light illumination interval, the LCI module 108 disengages the green light 208 while the constant yellow light. 206 remains illuminated. At step 408, the LCI module 108 disengages the yellow light 206 and illuminates the red light 204 at the end of the yellow light illumination interval. The process proceeds to the end block.

The illustration of FIG. 5 presents a flowchart of a process of providing a traffic signal change from a green light to a red light using simultaneous green and flashing yellow light illumination, according to one or more embodiments. The process of FIG. 5 begins at the initiator/start block and proceeds to step 502 or green light illumination interval, at which the LCI module 108 illuminates the green traffic light 208 in a constant/solid/non-flashing state. At a specified amount of time prior to an end of green light illumination interval, the LCI module 108 illuminates a flashing yellow light while the constant green light remains illuminated, as shown at step 504.

According to an aspect, a driver or individual that sees only the illuminated green light will have received indication that the green light illumination is at an earlier stage of the green light illumination interval. On the other hand, a driver or individual that sees the simultaneous illumination of the green light and the yellow light will have received indication that the green light illumination is at a closing stage of the green light illumination interval.

At step 506, the LCI module 108 enables the yellow light to flash a specified number of times before the green light illumination interval expires. According to an aspect, the LCI module 108 provides a flashing traffic light near the end of a traffic light interval as an intuitive way to indicate an imminent change in traffic light signaling. As a result, the LCI module 108 enhances the traffic light signaling system without drastically overhauling the system by providing intuitive signal change indicators that do not require the driver or pedestrian to learn an entirely new traffic signaling protocol.

According to an aspect, by providing imminent light change indicators, such as simultaneous green and yellow light illumination and/or flashing/blinking lights, in specific time intervals/sub-intervals, the LCI module helps to reduce uncertainty attributable to erratic light changing.

At step 508, at the end of the green light illumination interval, the LCI module 108 disengages (turns off) the green light and changes the flashing yellow light to a constant yellow light. At step 510, the LCI module 108 disengages the yellow light and illuminates the red light at the end of the yellow light illumination interval. The process proceeds to the end block.

The illustration of FIG. 6 presents a flowchart illustrative of the process of providing a traffic signal change from a solid yellow light to a flashing yellow light at the end of the yellow light illumination interval, according to one or more embodiments. The process of FIG. 6 begins at the initiator/start block and proceeds to step 602, at which the LCI module 108 illuminates the green traffic light 208 in a constant/solid/non-flashing state. At a specified amount of time prior to an end of green light illumination interval, the LCI module 108 illuminates a flashing yellow light while the constant green light remains illuminated, as shown at step 604.

According to an aspect, a driver or individual that sees only the illuminated green light will have received indication that the green light illumination is at an earlier stage of the green light illumination interval. On the other hand, a driver or individual that sees the simultaneous illumination of the green light and the yellow light will have received an indication that the green light illumination is at a closing stage of the green light illumination interval.

At step 606, the LCI module 108 enables the yellow light to flash a specified number of times before the green light illumination interval expires. According to an aspect, the LCI module provides a flashing traffic light near the end of a traffic light interval as an intuitive way to indicate an imminent change in traffic light signaling. As a result, the LCI module enhances the traffic light signaling system without drastically overhauling the system by providing intuitive signal change indicators that do not require the driver or pedestrian to learn an entirely new traffic signaling protocol.

According to an aspect, by providing imminent light change indicators, such as simultaneous green and yellow light illumination and/or flashing/blinking lights, in specific time intervals/sub-intervals, the LCI module helps to reduce uncertainty attributable to erratic light changing.

At the end of the green light illumination interval, the LCI module 108 disengages the green light and changes the flashing yellow light to a constant yellow light, as shown at step 608, At a specified amount of time before the end of the yellow light illumination interval, the LCI module 108 changes the constant yellow light to a flashing yellow light, as shown at step 610. At step 612, the LCI module 108 disengages the yellow light and illuminates the red light at the end of the yellow light illumination interval. The process proceeds to the end block.

As described herein, a method, a system and a computer program product provide an advance signal change notification for a traffic light system. A light change indicator (LCI) utility/module provides imminent light change warning signals to enable drivers and pedestrians to make decisions that can enhance traffic safety. The LCI module turns on a yellow traffic light to provide a light change warning via simultaneous illumination of a green traffic light and the yellow traffic light prior to expiration of the green light illumination interval. The yellow light remains illuminated until the end of the green light interval. According to an aspect, the yellow light flashes a pre-established number of times before the green light interval expires. The LCI module turns off the green light and allows the yellow light to remain on for a duration of the yellow light interval. According to an aspect, the LCI module also provides an imminent light change indicator to indicate an imminent switch from the yellow light to the red light. As the yellow light interval ends, the LCI module turns off the yellow light and turns on the red traffic light.

According to an aspect, the LCI module provides one or more imminent light change indications that allow a driver to track the current state of a traffic light, to accurately predict the next state and to determine how imminent the change to the next traffic light state is.

According to an aspect, by providing imminent light change indicators, such as simultaneous green and yellow light illumination and/or flashing/blinking lights, in specific time intervals/sub-intervals, the LCI module helps to reduce uncertainty attributable to erratic light changing.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computerized method for providing an advance traffic light signal change notification for a traffic light apparatus comprising a green traffic light, a yellow traffic light, and a red traffic light, the method comprising the steps of:

turning on the green traffic light during a green light illumination interval, while maintaining the yellow and red traffic lights in a turned-off state;

during a first amount of time prior to an end of the green light illumination interval, turning on the yellow traffic light to provide simultaneous illumination of the green traffic light and the yellow traffic light;

at the end of the green light illumination interval, turning off the green traffic light such that only the yellow traffic light remains on;

allowing the yellow traffic light to remain on during a yellow light illumination interval, while maintaining the green and red traffic lights in the turned-off state, wherein the step of allowing the yellow traffic light to remain on during said yellow light illumination interval comprises intermittently illuminating the yellow traffic light during a second part of the yellow light illumination interval, the second part immediately following a first part of the yellow light illumination interval starting at the end of the green light illumination interval, the second part extending to an end of the yellow light illumination interval, the second part having a duration equal to a second amount of time;

turning off the yellow traffic light at the end of the yellow light illumination interval; and turning on the red traffic light consecutively to turning off the yellow traffic light.

2. The method of claim 1, comprising the step of obtaining the first amount of time from a predetermined data stored in a computer memory.

3. The method of claim 1, comprising the steps of obtaining a preset number of flashes by the yellow traffic light from a computer memory, and calculating the first amount of time as corresponding to said preset number of flashes.

4. The method of claim 1, wherein the green light is constantly illuminated during the green light illumination interval.

5. The method of claim 1, wherein the yellow traffic light is constantly illuminated during the first amount of time prior to the end of the green light illumination interval.

6. The method of claim 1, wherein the yellow traffic light is intermittently illuminated during the first amount of time prior to the end of the green light illumination interval.

7. The method of claim 6, wherein the step of turning off the green traffic light such that only the yellow traffic light remains on comprises maintaining the yellow traffic light intermittently illuminated, and further wherein the step of allowing the yellow traffic light to remain on during the yellow light illumination interval comprises maintaining the yellow traffic light intermittently illuminated during the first part of the yellow light illumination interval.

8. The method of claim 1, wherein the step of allowing the yellow traffic light to remain on during the yellow light illumination interval comprises constantly illuminating the yellow traffic light during the first part of the yellow light illumination interval.

9. The method of claim 8, comprising the step of obtaining the second amount of time from a predetermined data stored in a computer memory.

10. The method of claim 8, comprising the steps of obtaining a preset number of flashes by the yellow traffic light from a computer memory, and calculating the second amount of time as corresponding to said preset number of flashes.

11. A system for providing an advance traffic light signal change notification for a traffic light apparatus, comprising:

a traffic light apparatus comprising a green traffic light, a yellow traffic light, and a red traffic light; and a processor unit, operatively connected to the traffic light apparatus and configured to selectively power the green traffic light, yellow traffic light and red traffic light, the processor unit comprising a processor and a memory, the memory storing computer-readable instructions configured to cause the processor to execute the operations of:

turning on the green traffic light during a green light illumination interval, while maintaining the yellow and red traffic lights in a turned-off state;

during a first amount of time prior to an end of the green light illumination interval, turning on the yellow traffic light to provide simultaneous illumination of the green traffic light and the yellow traffic light;

at the end of the green light illumination interval, turning off the green traffic light such that only the yellow traffic light remains on;

allowing the yellow traffic light to remain on during a yellow light illumination interval, while maintaining the green and red traffic lights in the turned-off state, wherein the step of allowing the yellow traffic light to remain on during said yellow light illumination interval comprises intermittently illuminating the yellow traffic light during a second part of the yellow light illumination interval, the second part immediately following a first part of the yellow light illumination interval starting at the end of the green light illumination interval, the second part extending to an end of the yellow light illumination interval, the second part having a duration equal to a second amount of time;

turning off the yellow traffic light at the end of the yellow light illumination interval; and turning on the red traffic light consecutively to turning off the yellow traffic light.

12. The system of claim 11, wherein the yellow traffic light is constantly illuminated during the first amount of time prior to the end of the green light illumination interval.

13. The system of claim 11, wherein the yellow traffic light is intermittently illuminated during the first amount of time prior to the end of the green light illumination interval.

14. The system of claim 11, wherein the step of allowing the yellow traffic light to remain on during the yellow light illumination interval comprises constantly illuminating the yellow traffic light during the first part of the yellow light illumination interval.

15. A non-transitory computer-readable medium storing processor-readable instructions configured to cause a processor to execute the operations of:

communicating with a traffic light apparatus comprising a green traffic light, a yellow traffic light, and a red traffic light;

turning on the green traffic light during a green light illumination interval, while maintaining the yellow and red traffic lights in a turned-off state;

during a first amount of time prior to an end of the green light illumination interval, turning on the yellow traffic light to provide simultaneous illumination of the green traffic light and the yellow traffic light;

at the end of the green light illumination interval, turning off the green traffic light such that only the yellow traffic light remains on;

allowing the yellow traffic light to remain on during a yellow light illumination interval, le maintaining the green and red traffic lights in the turned-off state, wherein the step of allowing the yellow traffic light to remain on during said yellow light illumination interval comprises intermittently illuminating the yellow traffic light during a second part of the yellow light illumination interval, the second part immediately following a first part of the yellow light illumination interval starting at the end of the green light illumination interval, the second part extending to an end of the yellow light illumination interval, the second part having a duration equal to a second amount of time;

turning off the yellow traffic light at the end of the yellow light illumination interval; and turning on the red traffic light consecutively to turning off the yellow traffic light.

16. The non-transitory computer-readable medium of claim 15, wherein the yellow traffic light is constantly illuminated during the first amount of time prior to the end of the green light illumination interval.

17. The non-transitory computer-readable medium of claim 15, wherein the yellow traffic light is intermittently illuminated during the first amount of time prior to the end of the green light illumination interval.

18. The non-transitory computer-readable medium of claim 15, wherein the step of allowing the yellow traffic light to remain on during the yellow light illumination interval comprises constantly illuminating the yellow traffic light during the first part of the yellow light illumination interval.

* * * * *